June 10, 1958 E. L. SNYDER 2,838,649
STOCK TANK HEATER
Filed May 22, 1957
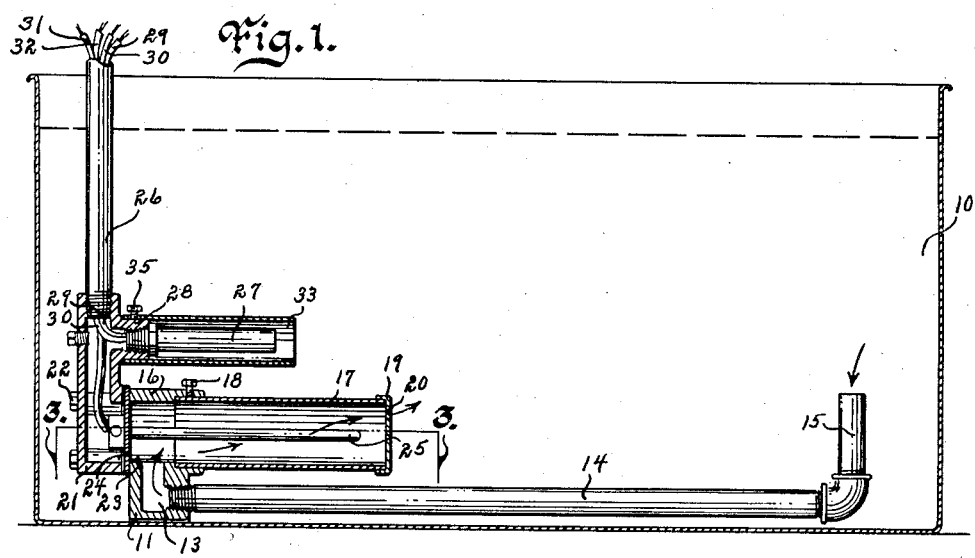
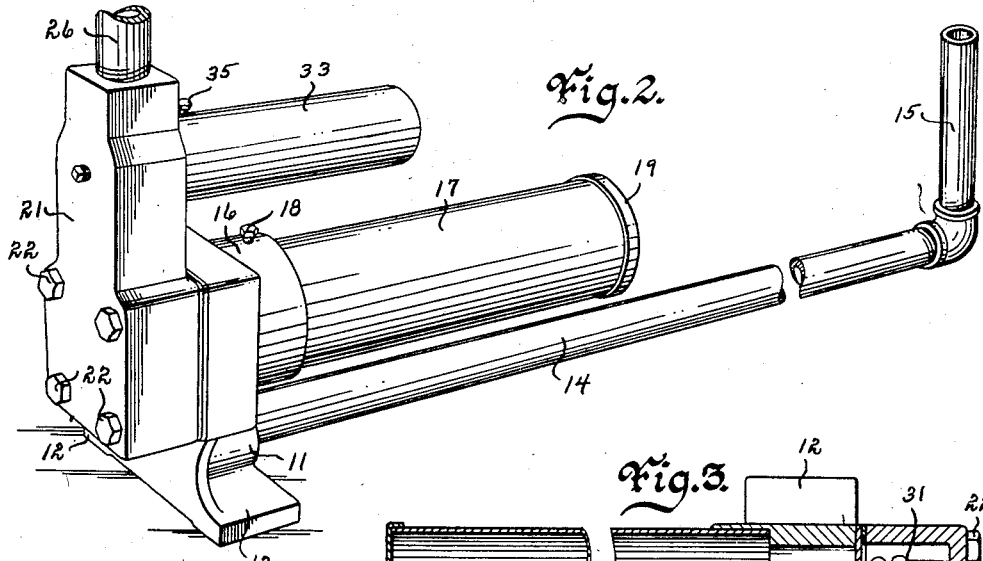
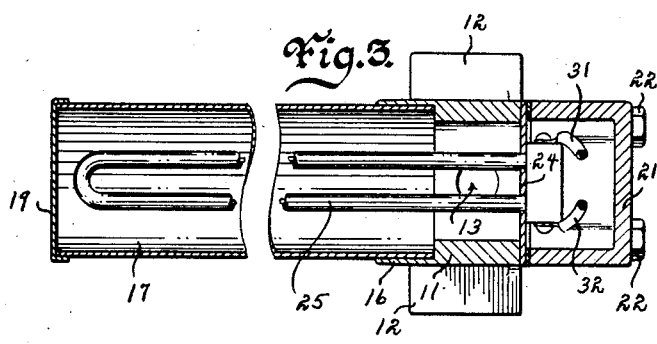
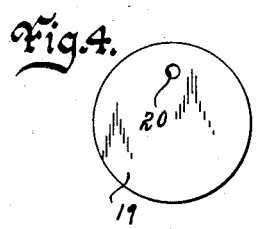
Inventor
Elmer L. Snyder
by M. Talbert Dick
Attorney

United States Patent Office 2,838,649
Patented June 10, 1958

2,838,649

STOCK TANK HEATER

Elmer L. Snyder, Spencer, Iowa

Application May 22, 1957, Serial No. 660,824

3 Claims. (Cl. 219—38)

This invention relates to a heating means for warming the drinking water in stock tanks and more particularly to a tank heater that produces automatic circulation of the water in the tank.

One of the chief problems of stock raisers during the winter months is the maintenance of the livestock drinking water at a temperature where it will not freeze. Also farm animals prefer drinking water that is not severely cold and any encouragement for the animals to drink more water is desirable, especially in the case of milk cows.

Many attempts have been made to heat the tank water. Some systems use gas or oil as the fuel, while others have used electricity. Most such devices require extensive installation and in some cases the watering tank itself must undergo modifications for the installation. Another objection to the heretofore tank heaters is that the water in the tank is not properly circulated to produce near uniform water temperature throughout the tank.

Therefore, one of the principal objects of my invention is to provide a water tank heater that is easily and quickly installed and without modifying the tank in which it is used.

A further object of this invention is to provide a tank heater that not only heats the water in the tank, but circulates the water.

A still further object of my invention is to provide a water tank heater that requires little attention once it has been installed in a water tank.

Still further objects of my invention are to provide a stock water heater that is economical in manufacture, durable in use, and refined in appearance.

These and other objects will be apparent to those skilled in the art.

My invention consists in the construction, arrangements, and combinations, of the various parts of the device, whereby the objects contemplated are attained as hereinafter more fully set forth, specifically pointed out in my claims, and illustrated in the accompanying drawings, in which:

Fig. 1 is a side view of my device in use in a water tank and with sections cut away to more fully illustrate its construction, Fig. 2 is an enlarged perspective view of my water heater, Fig. 3 is a vertical sectional view of the heating unit taken on line 3—3 of Fig. 1, and Fig. 4 is an enlarged outer end view of the heating unit.

In these drawings I have used the numeral 10 to designate an ordinary open top stock water tank. It is into such a tank that I set my heater and which I will now describe in detail. The numeral 11 designates the base housing of the device and which may have feet 12. In installing, this base is set onto the floor of the tank 10, as shown in Fig. 1. The numeral 13 indicates the lower inside area of the housing. When the device is placed in a tank it is located at near one end of the tank. The numeral 14 designates an elongated horizontal pipe threaded into the housing 11 and communicating with the bottom inside area 13. The numeral 15 designates a vertical length of pipe operatively threaded into the free end of the pipe 14 and communicating with the inside of the same. The numeral 16 designates a collar on the base 11, communicating with the inside of the base housing and extending in the same direction above and parallel with the pipe 14. This collar supports the cylinder housing 17 which has one end extending into the collar and detachably held therein by a set screw 18. The numeral 19 designates a cap closing the outer end of the cylinder housing and which has a relatively small outlet hole 20 in its upper area, as shown in Fig. 4. This hole 20 is smaller in diameter than that of the diameter of the pipe 14. The diameter of the cylinder housing is substantially greater than that of the diameter of the pipe 14. The numeral 21 designates a second housing detachably secured to the back of the housing 11 by cap screws 22. The numeral 23 designates an opening in the back upper area of the base 11 communicating with the inside of the second housing 21. This communication between the two housings, however, is normally closed by a gasket wall 24 between the two housings 11 and 21, as shown in Fig. 3. The wall gasket carries an ordinary electrical heat unit 25 which has its element extending into the cylinder housing and its contact connections in the second housing 21, as shown in Fig. 1.

The numeral 26 designates a vertical conduit pipe having its lower end threaded into the top of the housing 21 and communicating with the inside of the housing 21. This pipe 26 extends above the top of the tank 10 and therefore the inside of the housing 21 is not contacted by the tank water. The numeral 27 designates an ordinary sealed thermostat switch threaded into a boss 28 on the housing 21 at a point above the collar 16. The inside of the boss 28 communicates with the inside of the housing 21. Thus, the thermostat will be held in a plane above the housing 17 and its two electric lead wires 29 and 30 will pass through the boss 28, thence into the second housing 21, and thence upwardly and through the pipe 26. Also, the two electrical lead wires 31 and 32 of the heating unit will pass from inside the second housing upwardly and through the conduit pipe 26. The numeral 33 designates a protective open ended cylinder on the boss 28 and loosely embracing the thermostat, as shown in Fig. 1. This cylinder is detachably held in place by a set screw 35. By having the four separate electrical lead wires, it is easy to determine the location and repair of any electrical trouble. As is well known, the wires of the heating element will be in communication with a source of electrical energy and the thermostat switch will be electrically imposed in the circuit.

With my device in a tank having water, the thermostatic switch will, if the water is below a predetermined temperature, complete the electrical circuit and the heating unit 25 will heat up. This action will heat and expand the water in the cylinder housing 17. The heated water will shoot through the exhaust hole 20 and will flow upwardly and forwardly toward the far end of the water tank. This movement of the hot water will draw the colder water from the tank into the bottom area of the cylinder housing 17, where it in turn will be heated and expelled. The entering cold water, however, will be drawn from the far end area of the stock tank, i. e., it will enter the pipe 15, thence through the pipe 14, thence through the base housing area 13, and thence into the rear of the cylinder housing. Therefore, the circulation of the water in the tank will be constant as long as the heating unit is functioning. This makes for fresher water and also uniformly heated water throughout the water tank. In actual use, the rear end of the tank having the base housing 11 will be covered and insulated, and only the forward end of the tank will be open for use by the animals drinking therefrom. The parts 14, 17 and 33 are all horizontally arranged and parallel with each other.

Some changes may be made in the construction and arrangement of my stock tank heater without departing from the real spirit and purpose of my invention, and it is my intention to cover by my claims, any modified forms of structure or use of mechanical equivalents which may be reasonably included within their scope.

I claim:

1. In combination, a tank adapted to contain water, a hollow base housing in the bottom area of said tank and adapted to be immersed in the water in the tank and having an opening in its upper area, a horizontal cylindrical housing having one end bottom area communicating with the opening of said base housing, an electrical heating element in said cylindrical housing having a circuit adapted to be in communication with a source of electrical energy; said cylindrical housing having an opening in its end that is opposite from its end that communicates with said base housing with said opening communicating directly with the inside of said tank, bottom tank engaging feet on said base housing, and an elongated water inlet pipe having one of its ends communicating with the inside bottom area of said base housing and its other end communicating with the inside of said tank at a point remote from said base housing for promoting the circulation of the water in the tank.

2. In combination, a tank adapted to contain water, a hollow base housing in the bottom area of said tank and adapted to be immersed in the water in the tank and having an opening in its upper area, a horizontal cylindrical housing having one end bottom area communicating with the opening of said base housing, an electrical heating element in said cylindrical housing having a circuit adapted to be in communication with a source of electrical energy; said cylindrical housing having an opening in its end that is opposite from its end that communicates with said base housing with said opening communicating directly with the inside of said tank, and an elongated water inlet pipe having one of its ends communicating with the inside bottom area of said base housing and its other end communicating with the inside of said tank at a point remote from said base housing for promoting the circulation of the water in the tank.

3. In combination, a tank adapted to contain water, a hollow base housing in the bottom area of said tank and adapted to be immersed in the water in the tank and having an opening in its upper area, a horizontal cylindrical housing having one end bottom area communicating with the opening of said base housing, an electrical heating element in said cylindrical housing having a circuit adapted to be in communication with a source of electrical energy; said cylindrical housing having an opening in its end that is opposite from its end that communicates with said base housing with said opening communicating directly with the inside of said tank, and an elongated water inlet pipe having one of its ends communicating with the inside bottom area of said base housing and its other end communicating with the inside of said tank at a point remote from said base housing for promoting the circulation of the water in the tank, said cylindrical housing having the opening in its end extending in a direction toward the free end of said water inlet pipe.

References Cited in the file of this patent
UNITED STATES PATENTS

| | | |
|---|---|---|
| 817,593 | Shipp | Apr. 10, 1906 |
| 2,297,030 | Snyder | Sept. 29, 1942 |
| 2,505,286 | Gratsinger | Apr. 25, 1950 |